United States Patent [19]

Urich et al.

[11] Patent Number: 5,287,687
[45] Date of Patent: Feb. 22, 1994

[54] HARVESTING APPARATUS

[75] Inventors: Oren D. Urich, Windsor; Gary L. Urich, Loveland; Randy L. Urich, Windsor, all of Colo.

[73] Assignee: Colorado Harvester, Inc., Loveland, Colo.

[21] Appl. No.: 939,447

[22] Filed: Sep. 2, 1992

[51] Int. Cl.$^5$ ............................................. A01D 46/00
[52] U.S. Cl. .................... 56/327.1; 56/328.1; 56/DIG. 2
[58] Field of Search ............... 56/327.1, 328.1, 330, 56/DIG. 2

[56] References Cited

U.S. PATENT DOCUMENTS

| | | | |
|---|---|---|---|
| 3,587,216 | 6/1971 | Grether et al. | 56/327 |
| 3,800,518 | 4/1974 | Baggiolini et al. | 56/327.1 |
| 4,214,427 | 7/1980 | Bobard et al. | 56/330 |
| 4,257,217 | 3/1981 | McClendon | 56/328.1 |
| 4,813,216 | 3/1989 | Day et al. | 56/27.5 |
| 4,965,993 | 10/1990 | Butler et al. | 56/327.1 |

FOREIGN PATENT DOCUMENTS 1336980  9/1987  U.S.S.R. ............... 56/328.1

OTHER PUBLICATIONS

Letter of Dale Marshall, U.S.D.A., dated Jul. 12, 1988.
Dale Marshall, "A Bibiography On The Mechanical Harvesting of Capsicum Peppers And Related Subjects", 1990.
Marshall et al., "Using Air To Convey Mechanically Harvested Peppers", Transactions In Agriculture, vol. 33(1), 1990.
The Great Lakes Vegetable Growers News, Nov., 1986.
"Pepper Progress in the 80's", American Vegetable Grower, pp. 18, 19, 22, Sep., 1986.
Marshall et al., "Influence of Certain Open Helix Variables on Pepper Damage":, Transactions of the ASAE, vol. 29, No. 3, pp. 714–778, 1986.
Proceedings of the Int'l. Symposium on the Fruit, Nut, and Vegetable Harvesting Hechanization, 1983.
Marshall et al., "Using Air To Convey Mechanically Harvested Peppers", Paper No. 82-1063, Am. Soc. of Agricultural Engineers, 1982.
Lenker et al. "Principles For Mechanically Harvesting and Cleaning Chili Peppers", Paper No. 80-1533, Am Soc. of Agricultural Engineers, 1980.
Marshall, "Performance of a Mechanical Pepper Harvester", ASAE Paper No. 79-1062, undated.
Marshall, "Estimates of Harvested Acreage, Production and Grower Value For Peppers Grown in the United States", 1976.
"Mechanizing the Harvest", U.S.D.A., Jan., 1975.
"Mechanical Harvester For Pimiento and Bell Pepper" pp. 10-12, undated.

*Primary Examiner*—Mark Rosenbaum
*Assistant Examiner*—John M. Husar
*Attorney, Agent, or Firm*—Dean P. Edmundson

[57] ABSTRACT

Apparatus is disclosed for picking or harvesting agricultural products from plants on which they were grown. The apparatus is especially useful for harvesting peppers of various types (e.g., chili, bell, etc.). The apparatus includes fingers carried on elongated bars. Opposing bars are inclined relative to the ground and are moved through a circular path such that opposing fingers engage and lift the products and separate them from the plants. The apparatus is very efficient in harvesting agricultural products and does not crush or damage fragile products or the plants on which the products are grown.

19 Claims, 5 Drawing Sheets

HARVESTING APPARATUS

FIELD OF THE INVENTION

This invention relates to apparatus for harvesting agricultural products. More particularly, this invention relates to apparatus for harvesting products such as peppers.

BACKGROUND OF THE INVENTION

Although mechanized harvesting techniques have been developed for harvesting a wide variety of agricultural products, the many problems associated with harvesting products such as peppers have discouraged the development of practical and effective apparatus for harvesting such products. Even though attempts have been made to mechanize the harvesting of such products, the machines which have been developed have not been entirely satisfactory.

As a result of the failed attempts to mechanize the picking of agricultural products such as peppers, most of such products are still harvested by means of manual labor. This is very costly and time consuming.

There has not heretofore been provided harvesting apparatus for picking agricultural products (such as peppers) which is effective, economical, and convenient.

SUMMARY OF THE PRESENT INVENTION

In accordance with the present invention there is provided apparatus for picking (i.e., harvesting) agricultural products from plants. The apparatus is effective for harvesting products such as peppers of all different varieties, tomatoes, eggplant, cucumbers, or other bush or vine products or fruit.

In a preferred embodiment, the apparatus comprises:
(a) a wheeled frame;
(b) a power source carried on the frame;
(c) header means carried by the frame and powered by the power source; wherein the header means comprises:
  (1) first and second spaced apart plucking means; wherein each of the plucking means comprises spaced-apart fingers; wherein the fingers are adapted to move in a manner such that the fingers of the first and second plucking means move towards each other and raise upwardly so as to engage the agricultural products and separate them from the plants; and
  (2) conveyor means for conveying the products away from the plucking means.

Preferably the fingers of the plucking means are mounted on elongated bars which are attached at their opposite ends to rotatable inclined disks. As the disks are rotated, the bars move upwardly and rearwardly relative to the longitudinal axis of the apparatus. Then as the disks are rotated further, the bars move downwardly and forwardly to complete the cycle. The fingers which are mounted on the bars remain generally horizontal as the disks rotate.

The first and second plucking means cooperate with each other so that the fingers on at least one of the bars of the first plucking means are preferably interleaved or complementary with the fingers on at least one of the bars of the second plucking means when the bars are at their closest position to each other. Then the fingers on opposing bars move upwardly and away from each other in the space of a few inches.

When the cooperating fingers on opposing bars move upwardly and towards each other, they engage the agricultural product being harvested and lift it relative to the plant on which it is hanging or from which it is suspended. The cooperating action of fingers on opposing bars is such that the product is lifted a small distance by the fingers on each of a succession of bars. Thus, even if a portion of the plant should be caught on one or more fingers on a particular bar, before the entire plant can be pulled out of the ground, the bars of the first and second plucking means move away from each other as the disks rotate. Consequently, the fingers on opposing bars are moved away from each other before the entire plant is torn from the ground. Then the fingers on the next bars moving upwardly can engage the product again, and so forth.

The harvesting apparatus of the invention is unique because the cooperating fingers are able to gently and effectively remove agricultural products from plants very rapidly and safely. The products are not crushed or damaged as they are removed from plants, nor does the apparatus damage the plants themselves. Also, the harvesting apparatus is highly efficient in removing ripened product from plants.

The apparatus of the invention can also be used to selectively pick or harvest a portion of the products suspended from a plant. For example, by moving the fingers farther apart to leave a larger gap between adjacent fingers the apparatus can be used to selectively harvest large products and leave small products attached to the plant. Also, by removing the fingers on the upper portions of the bars, the lower fingers are able to harvest products from the lowermost portion of the plant while leaving the products attached to the uppermost portion of the plant.

Other advantages of the apparatus of this invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
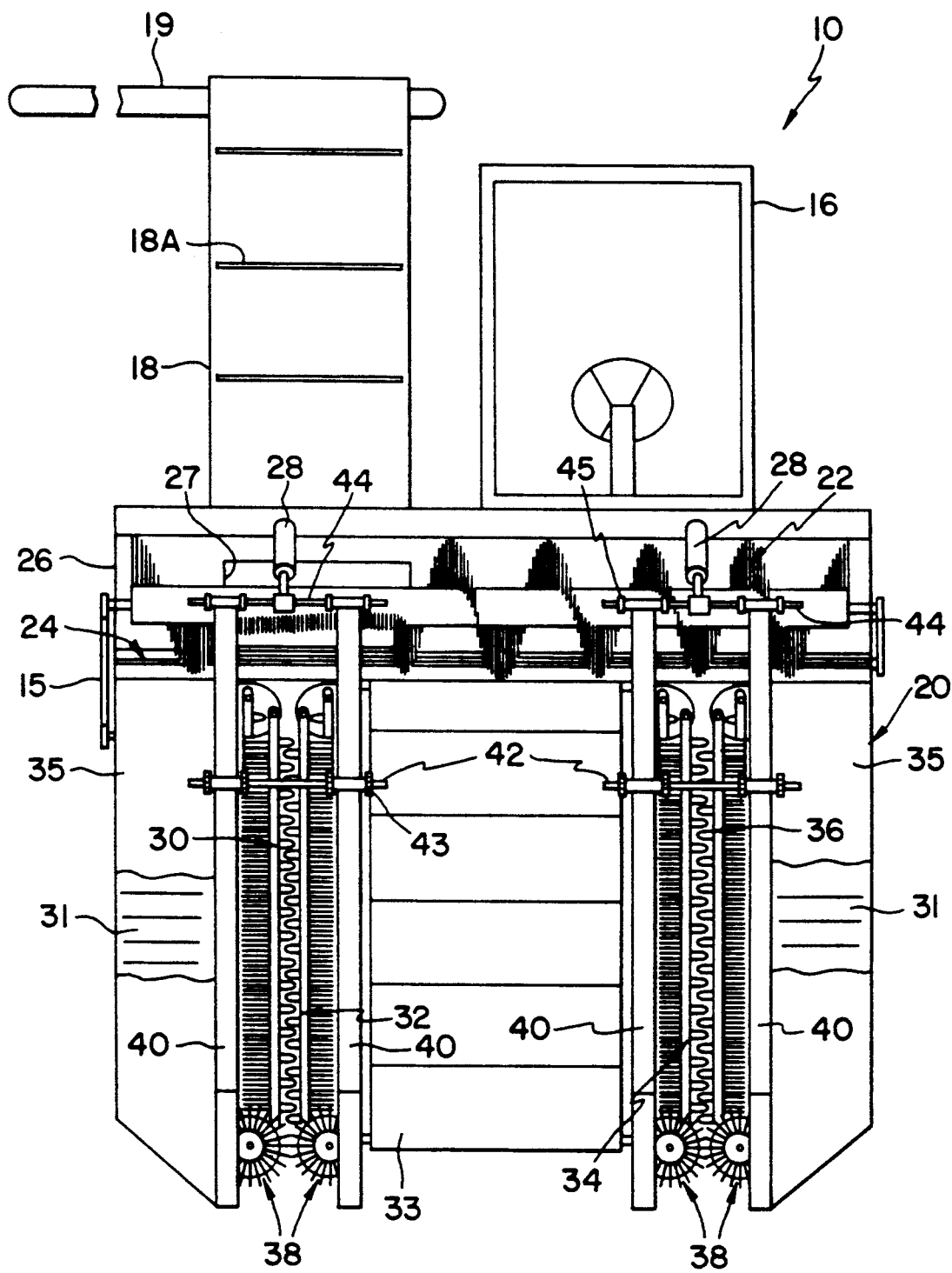
FIG. 1 is a front elevational view of a preferred embodiment of harvesting apparatus of the invention.

In the drawings there is illustrated a preferred embodiment of harvesting apparatus 10 of the invention for picking agricultural products from the plants on which they are connected or suspended. The apparatus comprises a frame 12 having front drive wheels 13 and rear wheels 14. A cab 16 is attached to the frame to accommodate the operator of the apparatus. An engine (e.g., gas or diesel) 17 is carried by the frame and serves as the power source for the apparatus.

Header means 20 is pivotably attached to the forward end of the frame by means of a pin 46 on opposite sides of the header means. The forward end of the header means can be raised or lowered by means of hydraulic cylinders 28.

The header means comprises spaced-apart plucking means for removing the desired agricultural products from the plants. In the embodiment shown in the drawings, the apparatus includes a first set of cooperating plucking means 30 and 32, and it also includes a second set of cooperating plucking means 34 and 36. Brushes 38 secured to the disks at the forward ends of the plucking means assist in guiding the plants between the cooperating fingers of the plucking means. Each set of plucking means is adapted to harvest products from a separate row of plants as the apparatus is driven across a field. The operation of the plucking means is described in more detail hereafter.

After the agricultural products have been separated from the plants, the products are conveyed upwardly and rearwardly by means of endless belts 31 and 33 to a transversely oriented roller system 24 located rearwardly of the plucking means. A rotating spiral brush or auger system 22 is positioned over the roller system 24 and parallel to it. The brush is driven by means of belt or chain 15 operably connected to the power source. The belts 31 and 33 may include transverse ribs or cleats or they may include a plurality of upstanding fingers to prevent the harvested product from rolling or sliding downwardly on the belts. Cover means 35 may extend over belts 31.

After the products are conveyed to the roller system, unwanted debris (such as portions of the plants themselves) is removed by the roller system, and the spiral brush 22 urges the harvested product transversely across the apparatus to the opening 27 in shroud or enclosure 26 where the brush 22 urges the products onto vertical conveyor 18. The conveyor 18 may include transverse ribs or cleats 18A or upstanding fingers or other such means for preventing the harvested products from rolling or sliding down the conveyor. Optionally, a transverse conveyor 19 may receive products from belt 18 and convey them to one side of the apparatus (e.g., for bagging purposes, or to load them on a truck or trailer). As another alternative, belt 18 may carry the products to another conveyor extending rearwardly of the apparatus.

Figure 2:
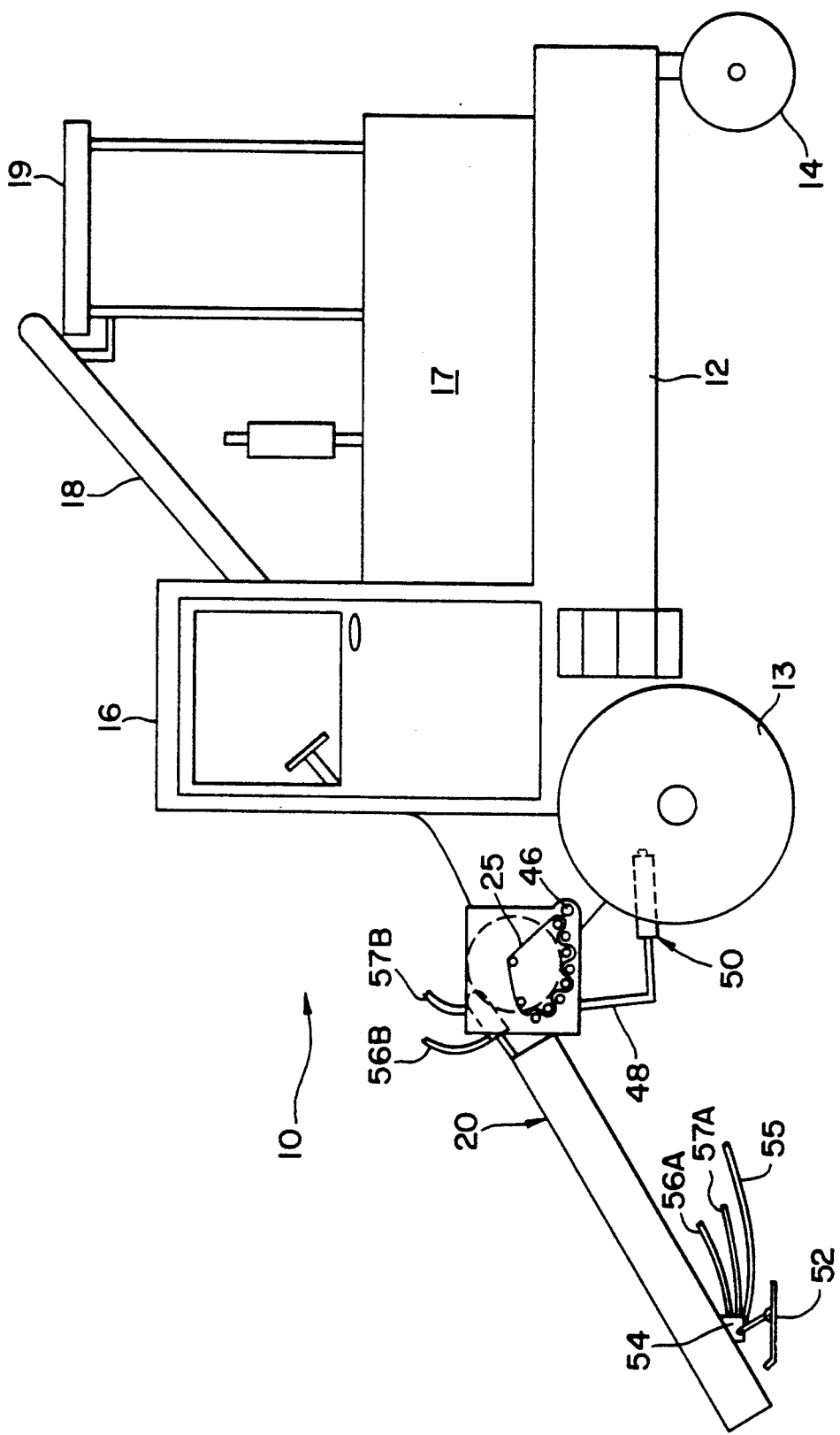
FIG. 2 is a side elevational view of the apparatus shown in FIG. 1.
Figure 8:
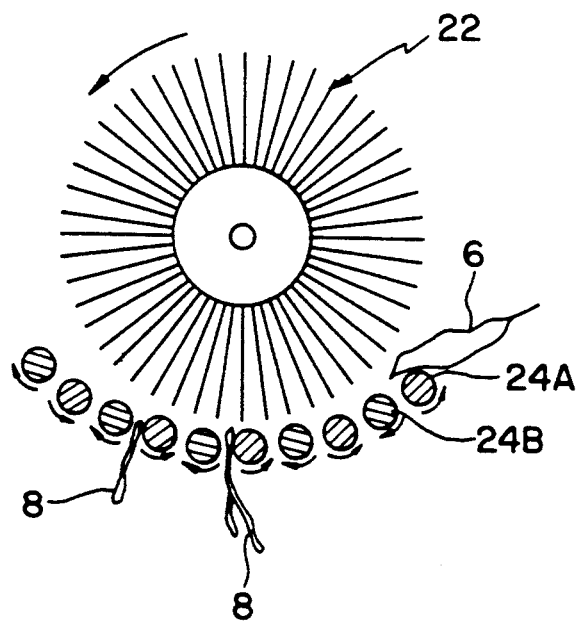
FIG. 8 is a sectional view illustrating operation of a roller system for removing plant portions from the harvested product.

The operation of the roller system 24 is illustrated in the cross-sectional view of FIG. 8. The rollers are present in parallel fashion, with the rollers forming an arc, as illustrated, having a radius slightly larger than the radius of the spiral brush 22. Unwanted plant portions 8 (e.g., portions of the stalk or branches of the plant) are removed between adjacent rollers while the desired product 6 remains above the rollers. The rollers 24A and 24B are presented in cooperating pairs. The rollers in each pair rotate in opposite directions, as illustrated by the arrows in FIG. 8, so as to facilitate removal of debris as shown. The rollers 24 are driven by belt or chain 25, as shown in FIG. 2.

Each plucking means comprises at least one elongated bar having a plurality of spaced-apart fingers attached thereto. Thus, plucking means 30 comprises at least one elongated bar 30A having a plurality of fingers 30B attached thereto and projecting laterally from one side of the bar 30A. Similarly, plucking means 32 comprises at least one elongated bar 32A having a plurality of fingers 32B attached thereto and projecting outwardly from one side of bar 32A.

Opposite ends of bar 30A are rotationally attached or mounted to rotatable disk members 30D and 30E by means of bolts 41. Opposite ends of bar 32a are similarly rotationally attached or mounted to separate rotatable disk members.

Figure 4:
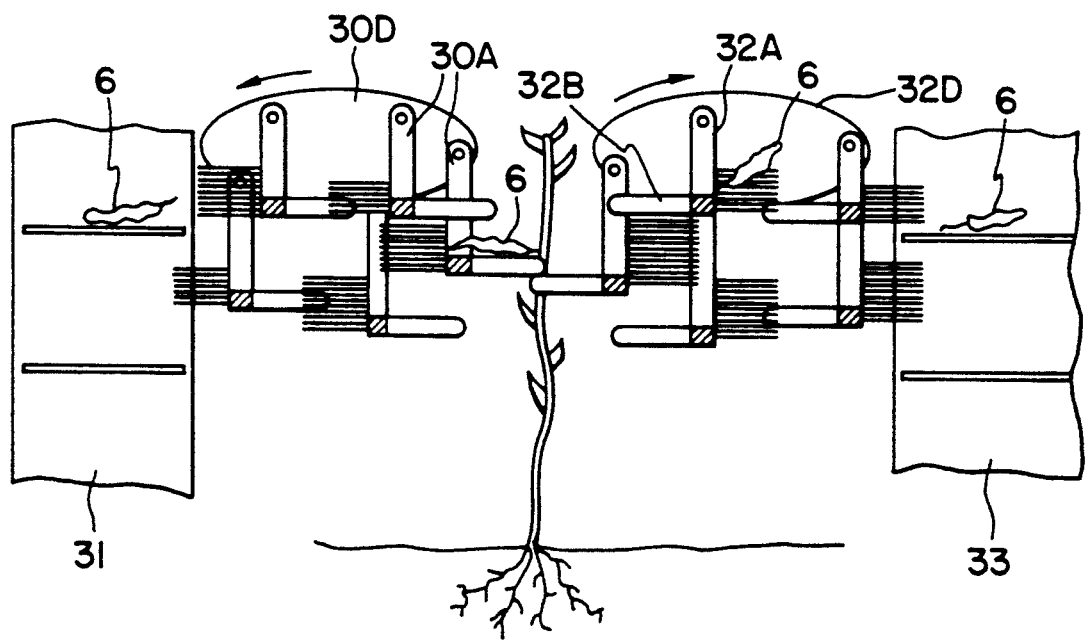
FIG. 4 is an elevational view illustrating the preferred manner of operation of the apparatus of FIG. 1.

As illustrated in FIG. 4, preferably there are several elongated bars 30A mounted around the periphery of disk 30D (and, correspondingly, the opposite ends of the plurality of bars 30A are mounted to the periphery of disk 30E so that the bars 30A are parallel to each other). In a similar fashion, there preferably are a plurality of bars 32A mounted at their opposite ends to the periphery of disks 32D and 32E.

Figure 5:
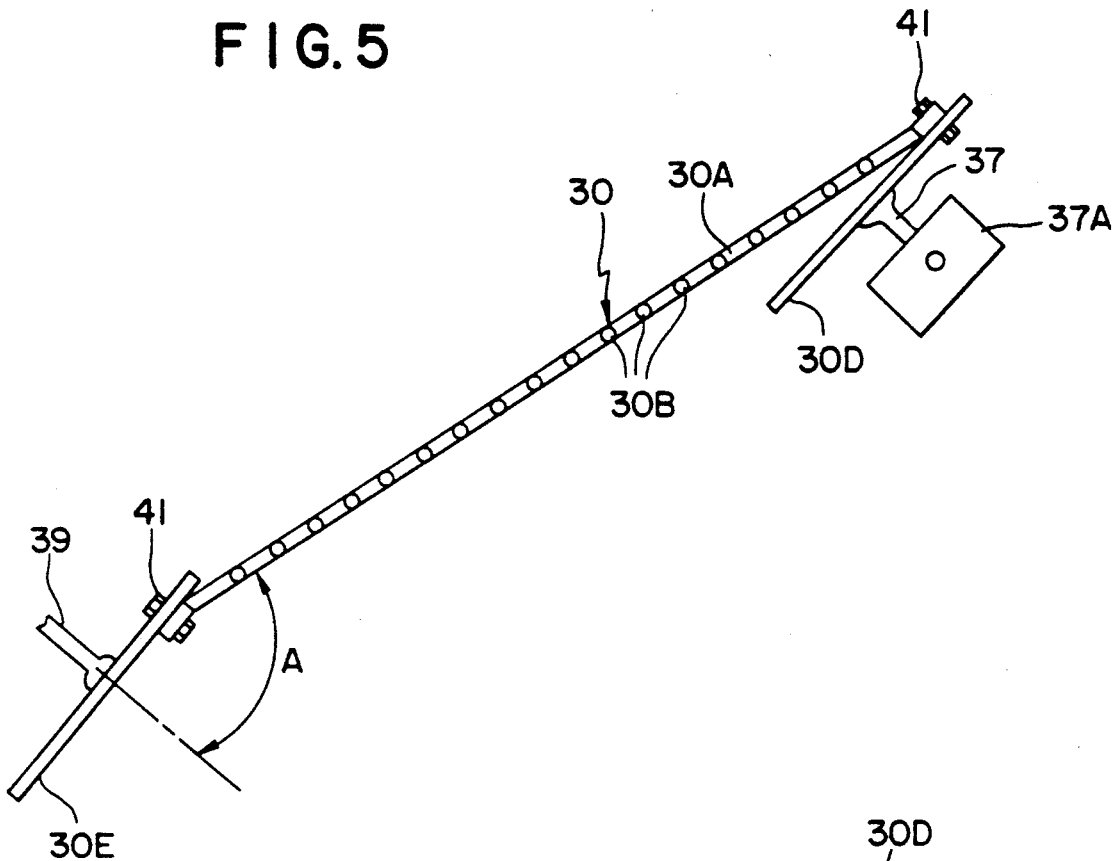
FIG. 5 is a side elevational view showing one of the plucking means.

As illustrated in FIG. 5, the disks 30D and 30E are parallel to each other and are inclined relative to a horizontal plane. As a result, bar 30A is also inclined relative to a horizontal plane. For ease of illustration, only one bar 30A is shown in FIG. 5. The angle A between bar 30A and the rotational axis of disk 30E is less than 90°.

Figure 6:
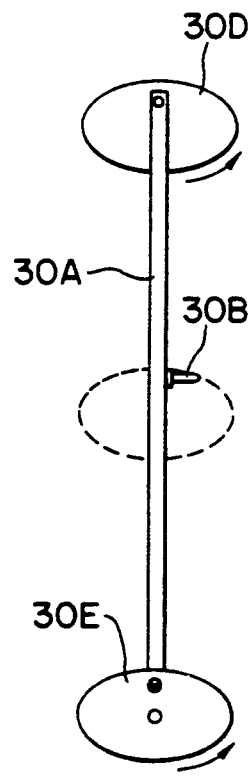
FIG. 6 is a front view illustrating the path of a given finger on one of the elongated bars.

Disk 30E is adapted to rotate in conjunction with shaft 39, and disk 30D is adapted to rotate in conjunction with shaft 37 (driven by gearbox 37A). Disk 30E is an idler. As the disks rotate, each bar 30A is forced to move through a path such that each finger 30B on the bar moves through a circular path which is inclined relative to a horizontal plane. This is shown by means of dotted lines in FIG. 6. The preferred speed of rotation of the disks is about 50 to 200 rpm.

Figure 3:
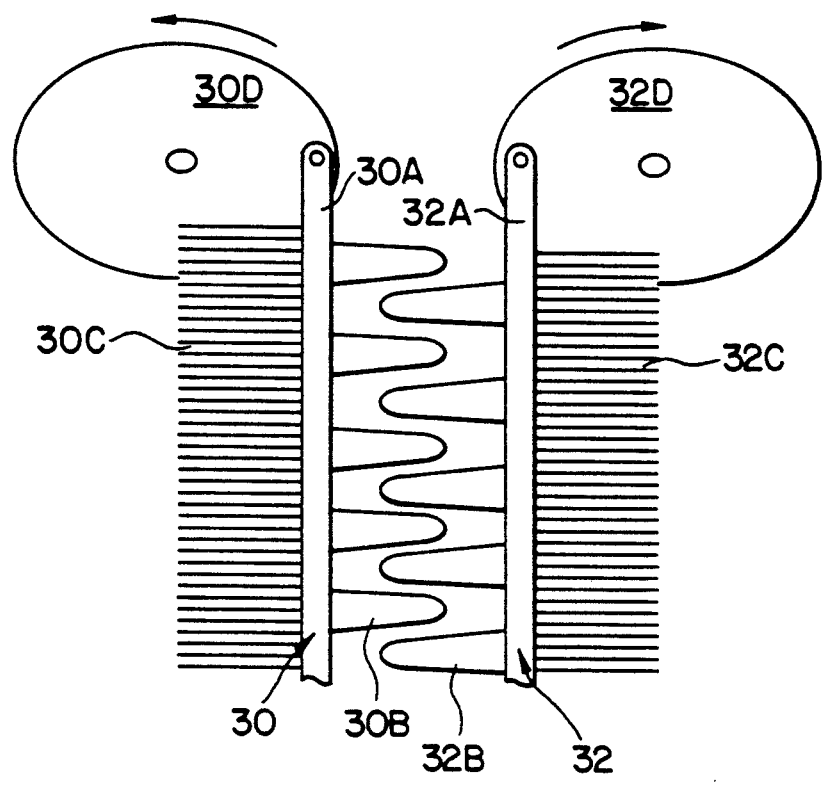
FIG. 3 is a top view showing the cooperating plucking means used in the apparatus of FIG. 1.

As illustrated in FIGS. 1, 3 and 4, the fingers on opposing bars 30A and 32A cooperate with each other to engage the product 6 which is suspended from a plant. As the disks on which the bars 30A and 32A are mounted rotate in the directions shown, the fingers 30B and 32B move towards each other (and preferably interleave or nearly interleave) and then lift so as to reach under the product 6 and lift it relative to the plant. Then the fingers on bars 30A and 32A move upwardly and away from each other, while successive bars 30A and 32A move towards each other and lift in the same manner.

Because the bars are inclined, and because the harvesting apparatus is moving forwardly at all times, the cooperating fingers each lift the product 6 only a very short distance before the fingers move away from each other again to allow fingers on successive bars to move towards each other and lift the product a further small distance. This is very desirable because it tends to prevent the entire plant from being torn out of the ground by the plucking means. The operation of the plucking means generates a certain amount of vibration in the plant and this helps to loosen ripened product from the plant.

After the product 6 has been separated or loosened from the plant, it is typically carried by the fingers and/or the brush 30C (or 32C) to either conveyor 31 or conveyor 33, respectively. The brushes 30C and 32C are generally lying in the same plane as the respective fingers 30B or 32B. The brushes are secured to opposite side of the bar 30A or 32A as fingers 30B or 32B, respectively, and extend outwardly a few inches.

As illustrated in FIG. 4, each finger 30B and 32B remains horizontal as the mounting disks rotate. The bars 30A and 32A remain inclined at the same angle as each other.

The operation of plucking means 34 and 36 is analogous to the operation just described for plucking means 30 and 32. If desired, there may be additional pairs of plucking means.

The size of the fingers may vary, as desired. For example, the length of the fingers may vary from about 1 to 5 inches. The diameters may also vary, e.g., from about 0.25 to 2 inches. The diameter of each finger may also vary along its length. Preferably the fingers on bar 30A are of the same general size as the fingers on bar 32A. The shape of the fingers may also vary. Preferably the fingers are of smaller diameter near their free end. In other words, it is preferable for the fingers to taper slightly from their fixed end to their free end. Preferably the fingers are resilient (e.g., they may be composed of rubber) so that they can bend or deflect slightly.

The spacing between adjacent plucking means may also be varied, as desired. For example, the spacing may be adjusted by appropriate manipulation of nuts 43 on the threaded rods 42. One such rod 42 spans the width of plucking means 30 and 32 and is secured to support members 40, and another such rod 42 spans the width of plucking means 34 and 36.

The spacing between the pair of plucking means 30 and 32 and the other pair 34 and 36 may also be adjusted. A threaded rod 44 is secured to the upper end of each support means 40, as shown in FIG. 1. Nuts 45 on rod 44 may be moved so as to adjust the lateral movement of the support means 40. The plucking means are supported by the support means 40. Belt 33 can be replaced with a narrower belt if the pairs of plucking means are moved towards each other to accommodate a narrow row spacing.

Figure 7:
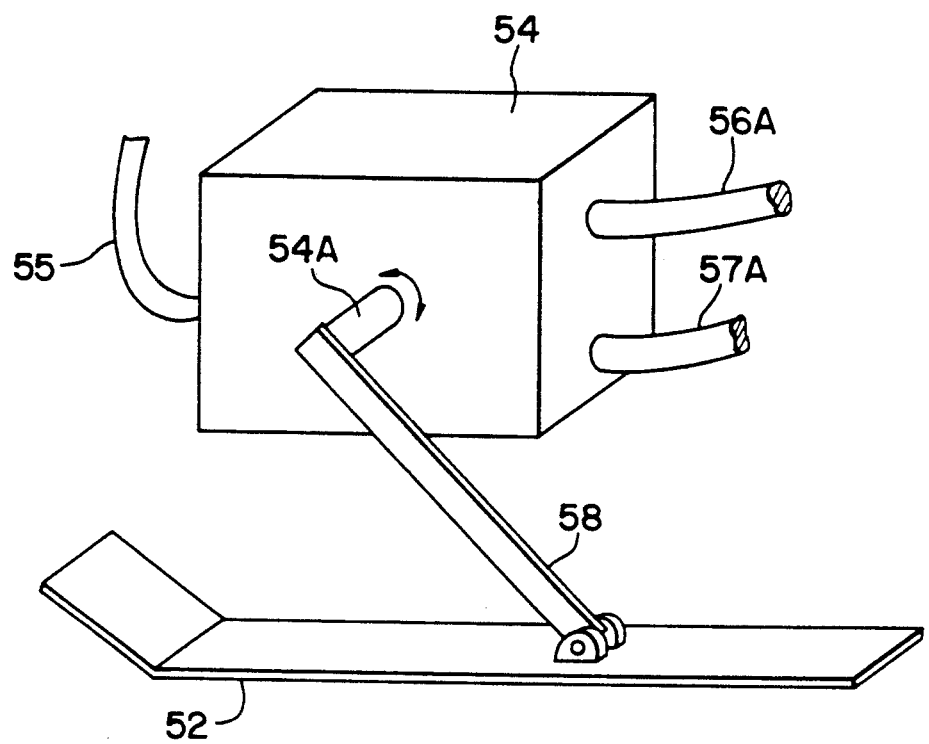
FIG. 7 is a perspective view of a height adjustment system for controlling the height of the header relative to the ground.

The height of the forward end of the header means relative to the ground is also adjustable. A preferred embodiment of automatic adjustment means is illustrated in FIG. 7. A shoe 52 is adapted to slide along the ground under the forward end of the header means. An arm 58 is pivotably attached at one end to the shoe. The opposite end of the arm 58 is secured to a shaft 54A of valve 54. A hydraulic supply hose 55 is connected to the valve, the two hydraulic hoses 56A and 57A are connected between the valve 54 and hydraulic cylinders 28 (where the hoses are identified as 56B and 57B). When the shoe 52 moves downwardly (with the contour of the ground) arm 58 moves downwardly and thereby causes shaft 54A to rotate in a first direction. As a result, the valve enables hydraulic fluid to pass through one of the hoses to cause the cylinder 28 to lengthen (and thereby tilt the header downwardly). When the shoe is urged upwardly by the ground, the shaft 54A is rotated in the opposite direction to causes hydraulic fluid to flow through the other hose to enable the cylinder 28 to raise the header means. Spring means may be included to assist the cylinder 28 in raising the header means, if desired.

The operation of the rotating plucking means in the apparatus of this invention is gentle to the vine or bush and also to the product which is to be harvested from the vine or bush. In other words, the fingers on the plucking means move in such a manner that opposing fingers on adjacent plucking means are always in motion in an inclined circular path as previously described and as shown in the drawings. In this manner, the multiple opposing fingers move towards each other and then away from each other while they are lifting the product from the vine or bush. This operation is highly preferable over apparatus in which opposing fingers move generally in concert with each other at a fixed distance between the opposing fingers.

Other variants are possible without departing from the scope of this invention. For example, the entire header means may be pivotably mounted to the forward end of the frame so that it can be raised or lowered by means of hydraulic cylinder 50 and arm 48. Also, the drive wheels 13 may be powered by hydraulic motors. It is also possible to mount the drive wheels on a transverse bar or carriage which can be moved laterally of the frame so as to enable one or both of the drive wheels to be moved laterally to accommodate a particular row spacing of the crop to be harvested.

What is claimed is:

1. Apparatus for picking agricultural products from plants, said apparatus comprising:
    (a) a wheeled frame;
    (b) a power source carried on said frame;
    (c) header means carried by said frame and powered by said power source; wherein said header means comprises:
        (1) first and second spaced apart plucking means; wherein each said plucking means comprises first and second spaced-apart rotatable mounting means and a plurality of elongated bars attached between said mounting means, wherein a plurality of spaced-apart fingers are secured to said bars and project outwardly therefrom; and wherein said bars are inclined relative to a horizontal plane; wherein said first and second mounting means comprise first and second disk members which are parallel to each other and are inclined relative to a horizontal plane; wherein said fingers are adapted to move in a manner such that said fingers of said first and second plucking means move towards each other and simultaneously raise upwardly so as to engage said products and separate them from said plants; wherein the fingers mounted on at least one of said bars of said first plucking means interleave with the fingers mounted on at least one of said bars of said second plucking means when said disk members are rotated; and
        (2) conveyor means for conveying said products away from said plucking means.

2. Apparatus in accordance with claim 1, wherein said conveyor means comprises at least one endless belt member adjacent to each said plucking means for receiving said products after they have been separated from said plant.

3. Apparatus in accordance with claim 1, wherein said header means includes forward and rearward ends; wherein said rearward end is pivotably attached to said frame.

4. Apparatus in accordance with claim 3, further comprising height adjustment means for adjusting the height of said forward end of said header means.

5. Apparatus in accordance with claim 3, further comprising rotating brush means at said forward end of said header means for urging said plants between said plucking means as said frame is moved in a forward direction.

6. Apparatus in accordance with claim 1, wherein said header means further comprises third and fourth plucking means disposed parallel to said first and second plucking means.

7. Apparatus in accordance with claim 6, further comprising a transverse roller system located rearwardly of said header means for separating said products from connected portions of said plants.

8. Apparatus in accordance with claim 6, further comprising adjustment means for adjusting the spacing between (a) said first and second plucking means, and (b) said third and fourth plucking means.

9. Apparatus in accordance with claim 1, wherein said first disk member includes an upper surface and said second disk member includes a lower surface; wherein each said bar member is attached between said upper surface of said first disk member and said lower surface of said second disk member.

10. Apparatus in accordance with claim 1, further comprising carrier means secured to each said bar; wherein said carrier means projects away from said bar in a direction opposite that of said fingers.

11. Apparatus in accordance with claim 10, wherein said carrier means comprises a brush.

12. Apparatus for picking agricultural products from plants, said apparatus comprising:
    (a) a wheeled frame;
    (b) a power source carried on said frame;
    (c) header means carried by said frame and powered by said power source; wherein said header means comprises;
        (1) first and second spaced-apart plucking means; wherein each said plucking means comprises first and second spaced-apart rotatable mounting means and a plurality of elongated bars attached between said mounting means, wherein a plurality of spaced-apart resilient fingers are secured to said bars and project outwardly therefrom in a horizontal plane; wherein said bars are inclined relative to a horizontal plane; wherein said first and second mounting means comprise first and second disk members; wherein said disk members are parallel to each other and are inclined relative to a horizontal plane; and wherein the fingers mounted on at least one of said bars of said first plucking means interleave with the fingers mounted on at least one of said bars of said second plucking means when said disk members are rotated; wherein said fingers are adapted to move in a manner such that said fingers of said first and second plucking means move towards each other and raise upwardly so as to engage said products and separate them from said plants; and
        (2) conveyor means for conveying said products away from said plucking means.

13. Apparatus in accordance with claim 12, wherein said conveyor means comprises at least one endless belt member adjacent to each said plucking means for receiving said products after they have been separated from said plants; and wherein said header means includes forward and rearward ends; wherein said rearward end is pivotably attached to said frame; and further comprising height adjustment means for adjusting the height of said forward end of said header means.

14. Apparatus in accordance with claim 12, wherein said header means further comprises third and fourth plucking means disposed parallel to said first and second plucking means; and further comprising a transverse roller system located rearwardly of said header means for separating said products from connected portions of said plants.

15. Apparatus in accordance with claim 14, further comprising rotating brush means at said forward end of said header means for urging said plants between said plucking means as said frame is moved in a forward direction.

16. Apparatus in accordance with claim 14, further comprising elevator means adjacent said roller system for conveying said products upwardly from said roller system.

17. Apparatus in accordance with claim 12, wherein said first disk member includes an upper surface and said second disk member includes a lower surface; wherein each said bar member is attached between said upper surface of said first disk member and said lower surface of said second disk member.

18. A method for harvesting agricultural products from plants on which such products are suspended, the method comprising the steps of:
    (a) providing first and second finger means disposed on opposite sides of said plants;
    (b) moving each said finger means in a manner such that said finger means move upwardly and towards each other to engage said products and separate them from said plants; wherein each said finger means comprises (a) at least one elongated bar and a plurality of fingers secured to said bar, and (b) first and second rotatable mounting means; wherein each said bar is attached between said mounting means; and wherein each said bar is inclined relative to a horizontal plane; wherein the fingers on each said bar are in the same plane; wherein the fingers on each said bar are parallel to each other; and wherein said fingers project outwardly from the same side of said bar.

19. Apparatus in accordance with claim 18, further comprising carrier means secured to each said bar; wherein said carrier means projects away from said bar in a direction opposite that of said fingers.

* * * * *